(12) United States Patent
Takita et al.

(10) Patent No.: US 8,068,887 B2
(45) Date of Patent: Nov. 29, 2011

(54) MOBILE TERMINAL DEVICE

(75) Inventors: Hiroyuki Takita, Kawasaki (JP);
Toshikazu Ishioka, Kawasaki (JP);
Manabu Matsushima, Kawasaki (JP);
Yoshifumi Kajiwara, Kawasaki (JP);
Kenta Sugimori, Kawasaki (JP);
Kazunobu Yoneyama, Kawasaki (JP);
Hiroshi Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 388 days.

(21) Appl. No.: 12/414,232

(22) Filed: Mar. 30, 2009

(65) Prior Publication Data

US 2009/0247246 A1 Oct. 1, 2009

(30) Foreign Application Priority Data

Mar. 31, 2008 (JP) .................. 2008-093083

(51) Int. Cl.
*H04M 1/00* (2006.01)
(52) U.S. Cl. ..................................... 455/575.3; 455/566
(58) Field of Classification Search ............... 455/575.3, 455/556.1, 556.2, 575.1, 575.2, 567, 550.1, 455/347, 351, 575.4
See application file for complete search history.

(56) References Cited

U.S. PATENT DOCUMENTS
7,430,013 B2 * 9/2008 Yang et al. .................... 348/376

FOREIGN PATENT DOCUMENTS
JP 10-172693 6/1998
* cited by examiner

*Primary Examiner* — Joseph Lauture
(74) *Attorney, Agent, or Firm* — Staas & Halsey LLP

(57) ABSTRACT

A mobile terminal device includes a fixed side housing including a fixed side front case and a fixed side rear case, the fixed side rear case having a circuit board and a frame chassis disposed adjacent to the circuit board, a movable side housing including a display, connected to the fixed side housing with a connecting part, a power connector provided in an end portion of the circuit board and having a connecting terminal, the connecting terminal being electrically connected to an electrode terminal of a battery pack when the battery pack is stored in a battery storage portion formed in the fixed side rear case, and a connector supporting member that is provided in an end portion of the frame chassis and supports the power connector by covering a circumference of the power connector.

4 Claims, 10 Drawing Sheets

FIG. 8

MOBILE TERMINAL DEVICE

CROSS-REFERENCE TO RELATED APPLICATIONS

This application is based upon and claims the benefit of priority of the prior Japanese Patent Application No. 2008-093083, filed on Mar. 31, 2008, the entire contents of which are incorporated herein by reference.

FIELD

Various embodiments of the present invention relate to a mobile terminal device. For example, a mobile terminal device in which a movable side housing and a fixed side housing are connected to each other in an overlapping manner with a connecting part. Also, a mobile telephone having a protective structure for a power connector of a circuit board is provided in the fixed side housing.

BACKGROUND

Recently, miniaturization and weight reduction of a mobile telephone have been achieved because of a multifunctional demand. Therefore, an occupied space of a battery storage portion in which a battery pack is stored is also reduced.

Figure 7A:
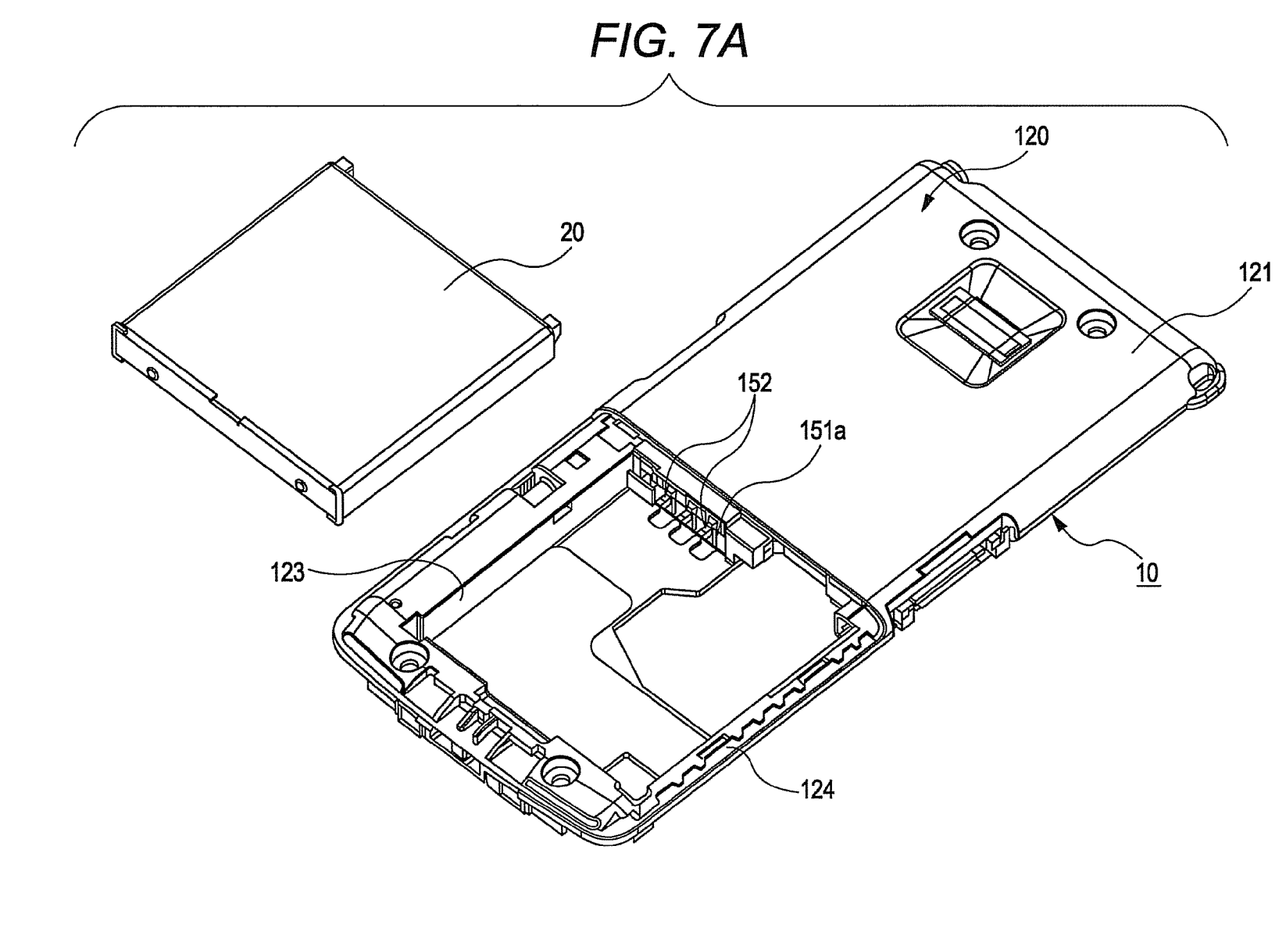
FIG. 7A is a view explaining a state before a battery pack is stored.
Figure 7B:
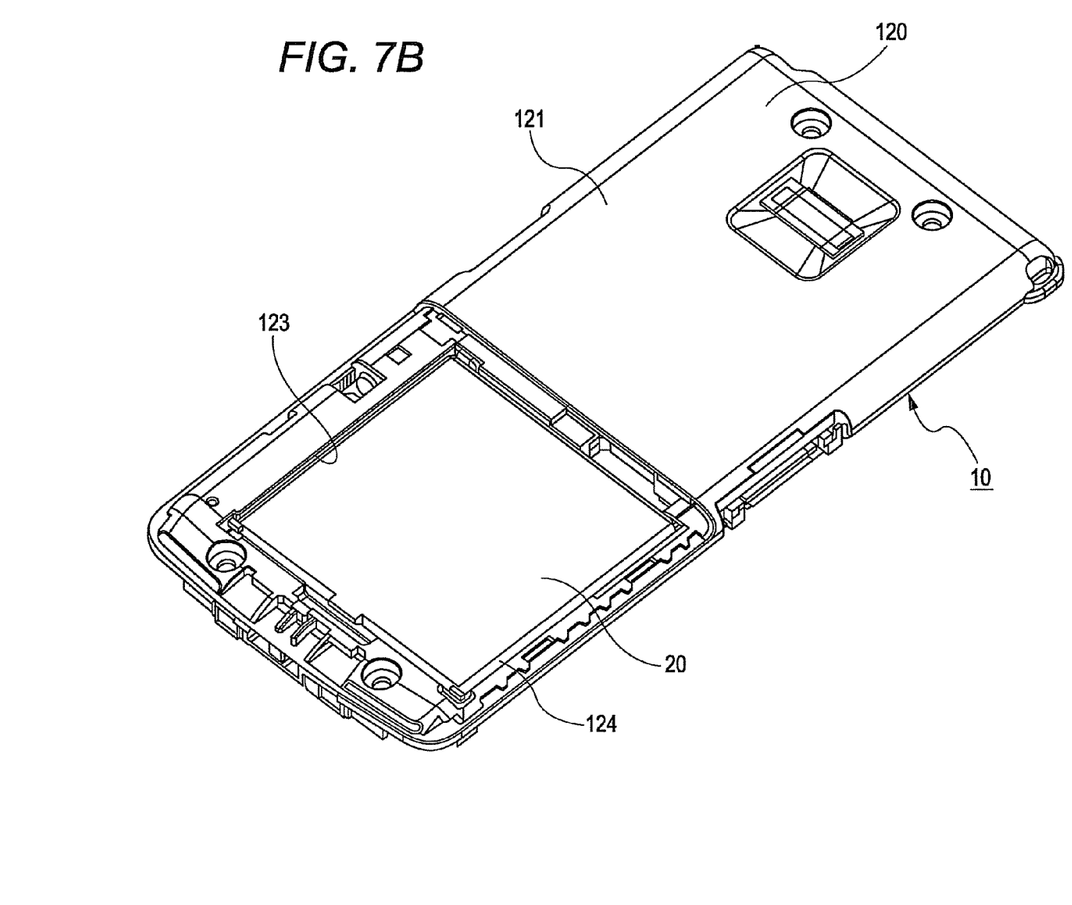
FIG. 7B is a view explaining a state in which the battery pack is stored.

The battery storage portion and battery pack, provided in the mobile telephone, will be described with reference to FIGS. 7A and 7B. FIG. 7A is a view explaining a state before a battery pack is stored. FIG. 7B is a view explaining a state in which the battery pack is stored.

As illustrated in FIG. 7A, a rectangular battery storage portion 123 is provided on the left of a bottom portion of a fixed side rear case 120. A groove portion 124 is formed around the battery storage portion 123. The groove portion 124 is closed by fitting a rear cover 30 of FIG. 8 in the groove portion 124.

A circuit board is provided in the fixed side rear case 120, and a power connector 151a having a connecting terminal 152 is fixed to the circuit board. As illustrated in FIG. 7B, when the battery pack 20 is stored in the battery storage portion 123, the connecting terminal 152 of the power connector 151a is electrically connected to an electrode terminal of the battery pack 20.

The battery pack 20 is stored in the battery storage portion 123, and the electrode terminal of the battery pack 20 is electrically connected to the connecting terminal 152 of the power connector 151a, which allows the power to be supplied onto the device side.

A space for a stroke of the connecting terminal 152 of the power connector 151a is hardly ensured because the mobile telephone is miniaturized as described above. A profile of the power connector 151a may not be ensured in the mobile telephone.

In cases in which the mobile telephone is accidentally dropped, sometimes the electrode terminal of the battery pack 20 and the connecting terminal 152 of the power connector 151a are instantaneously disconnected due to the drop impact.

For example, Japanese Laid-open Patent Publication No. 10-172693 discloses a technique of protecting the power connector provided in the circuit board. In the mobile terminal device disclosed in Japanese Laid-open Patent Publication No. 10-172693, a reinforcing frame is fitted in a circumference of a stacking connector to withstand the drop impact.

In such mobile telephones, the protection of the power connector is achieved to some extent. However, there remains such a problem caused by a displacement of the power connector in that the power is instantaneously cut out when the mobile telephone is dropped.

The problem will be described with reference to FIG. 8. The connecting terminal 152 is located at a position a when the battery pack 20 is not stored in the battery storage portion 123. The connecting terminal 152 is located at a position b when the battery pack 20 is stored in the battery storage portion 123. In cases where the mobile telephone is dropped, the battery pack 20 is located at a position c.

Figure 8:
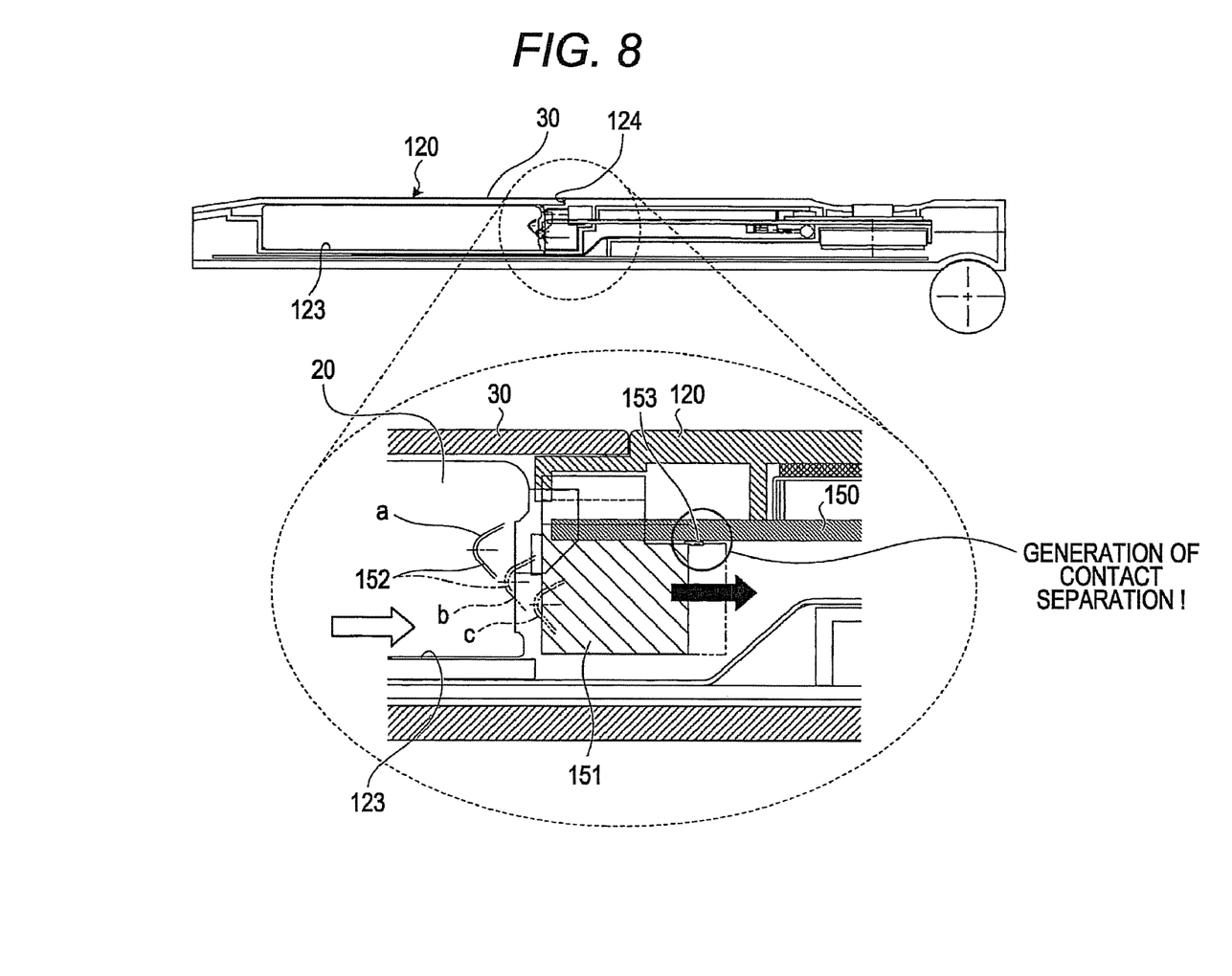
FIG. 8 is an enlarged sectional view illustrating a main part of an inside of a fixed side housing of a mobile telephone.

In cases where the mobile telephone is dropped, the power connector 151a is moved in a direction of a right arrow of FIG. 8 to separate a contact 153 of the power connector 151a, thereby generating the instantaneous cut-out of the power.

SUMMARY

Accordingly, it is an object in one aspect of the invention to provide a mobile terminal device that can prevent the instantaneous cut-out of the power. It is another object of the invention to provide a mobile terminal device which can prevent the terminal separation of the power connector when the drop impact is applied.

According to as aspect of the invention, a mobile terminal device includes a fixed side housing including a fixed side front case and a fixed side rear case, the fixed side rear case having a circuit board and a frame chassis disposed adjacent to the circuit board, a movable side housing including a display, the movable side housing being connected to the fixed side housing with a connecting part, a power connector that is provided in an end portion of the circuit board and has a connecting terminal, the connecting terminal being electrically connected to an electrode terminal of a battery pack when the battery pack is stored in a battery storage portion formed in the fixed side rear case, and a connector supporting member that is provided in an end portion of the frame chassis, the connector supporting member supporting the power connector by covering a circumference of the power connector.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A mobile terminal device according to a first embodiment will be described below with reference to the accompanying drawings. The mobile terminal device of the first embodiment is applied to a mobile telephone. The invention is not limited to the first embodiment.

First Embodiment

Figure 1:
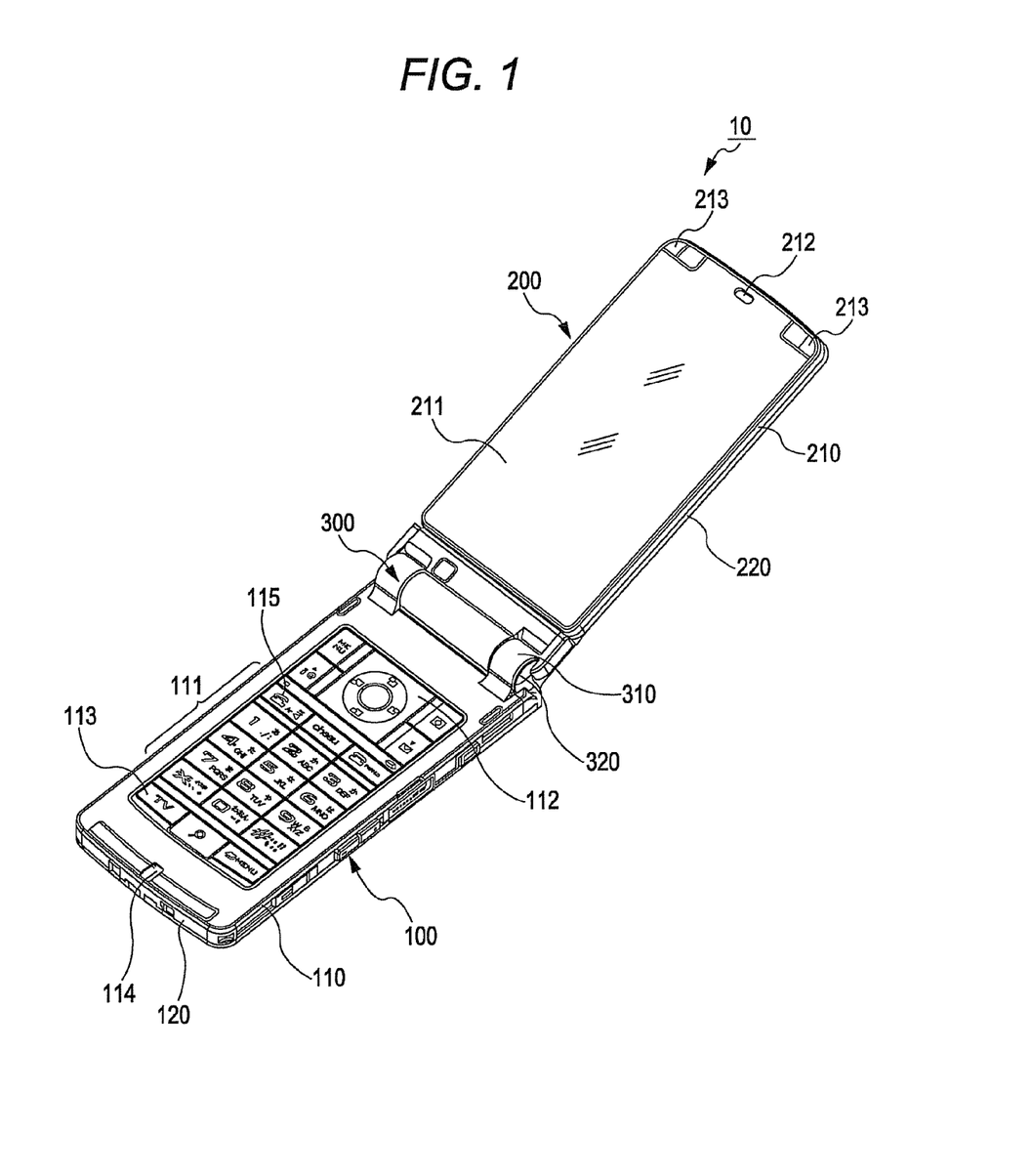
FIG. 1 is a perspective view illustrating an open state of a mobile telephone according to a first embodiment.

An entire configuration of the mobile terminal device will be described with reference to FIG. 1. In a mobile telephone 10, a palm-size fixed side housing 100 and a palm-size movable side housing 200 are connected with a connecting part 300.

The fixed side housing 100 is used for the telephone. The fixed side housing 100 includes various operation keys such as a ten-key pad 111 having numerical keys in which numerical characters 0 to 9 are printed and a function key 112 for a mode setting. The movable side housing 200 includes an LCD module having a size substantially identical to that of the fixed side housing 100. The fixed side housing 100 and the movable side housing 200 are connected to each other in the overlapping manner with the connecting part 300 including two hinge parts 310 and 320. The fixed side housing 100 and the movable side housing 200 are formed into a box shape, and are made of a light-weight and high-strength magnesium alloy.

The fixed side housing 100 has a two-section structure, which includes a fixed side front case 110 and a fixed side rear case 120. An operation panel 115 having various operation keys such as the ten-key pad 111 is disposed in the fixed side front case 110. The fixed side rear case 120 is located in the backside as illustrated in a lower portion of FIG. 1.

The fixed side front case 110 includes the ten-key pad 111, a function key 112, a videophone key 113, and a mouthpiece 114. A microphone is provided in the mouthpiece 114 to convert a speech sound of a user of the mobile telephone 10 into an electric signal. The cases 110 and 120 are fixed to each other at four points by attaching screws.

The movable side housing 200 has a two-section structure, which includes a movable side front case 210 and a movable side rear case 220. An LCD panel 211 is disposed in the movable side front case 210. The movable side rear case 220 is located in the backside as illustrated in an upper portion of FIG. 1. An earpiece 212 is provided in the movable side front case 210, and the user of the mobile telephone 10 places an ear against the earpiece 212 to hear the sound.

The cases 210 and 220 are fixed to each other at four points by attaching screws, and screw blindfold covers 213 are provided in a top portion of the LCD panel 211.

Figure 2:
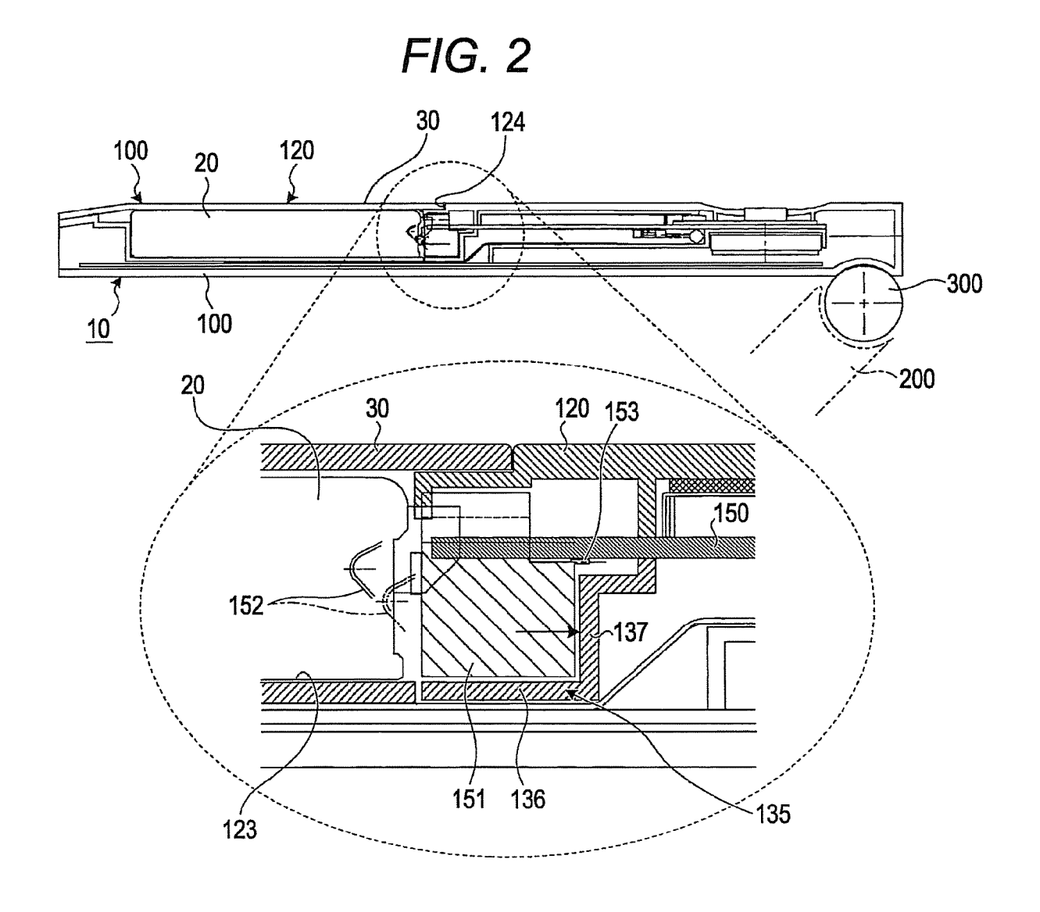
FIG. 2 is an enlarged sectional view illustrating an internal configuration and a main part of a fixed side housing.
Figure 3:
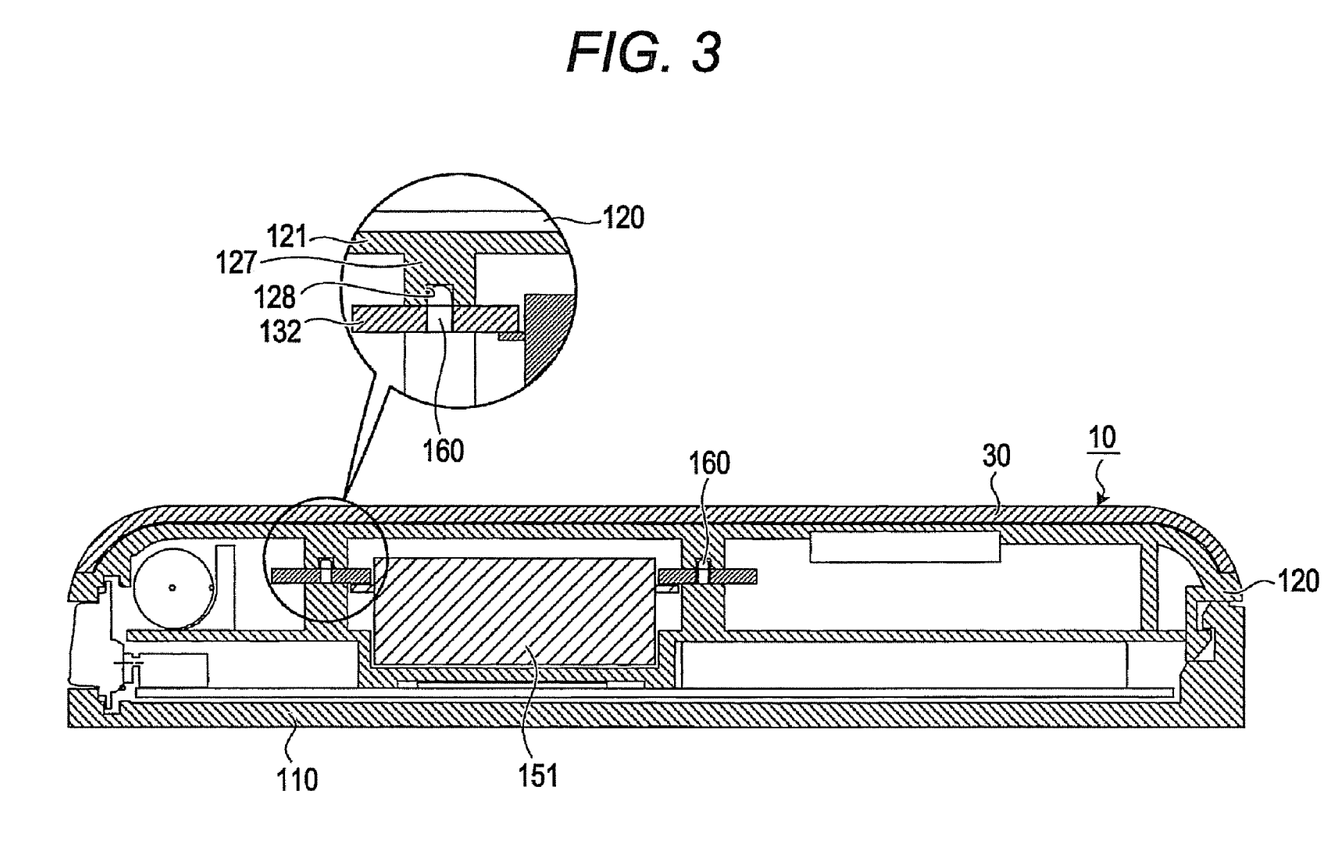
FIG. 3 is a longitudinal sectional view illustrating an internal configuration of the fixed side housing.

An internal configuration of the fixed side rear case 120 constituting the fixed side housing 100 will be described with reference to FIGS. 2 and 3. FIG. 2 is an enlarged sectional view illustrating an internal configuration and a main part of a fixed side housing. FIG. 3 is a longitudinal sectional view illustrating an internal configuration of the fixed side housing.

In the mobile terminal device of the first embodiment, a connector supporting member 135 is provided in a frame plate 130 provided in the fixed side rear case 120 in order to protect a power connector 151 fixed to an end portion of a circuit board 150.

The fixed side rear case 120 constituting the mobile telephone 10 includes the circuit board 150 and the frame plate 130, which is disposed adjacent to the circuit board 150. The power connector 151 is provided in one of the end portions of the circuit board 150, for example, on the right of FIG. 4 or on the left of FIG. 5. The power connector 151 is electrically connected to an electrode terminal of a battery pack 20 when the battery pack 20 is stored in a battery storage portion 123 formed in the fixed side rear case 120.

Figure 4:
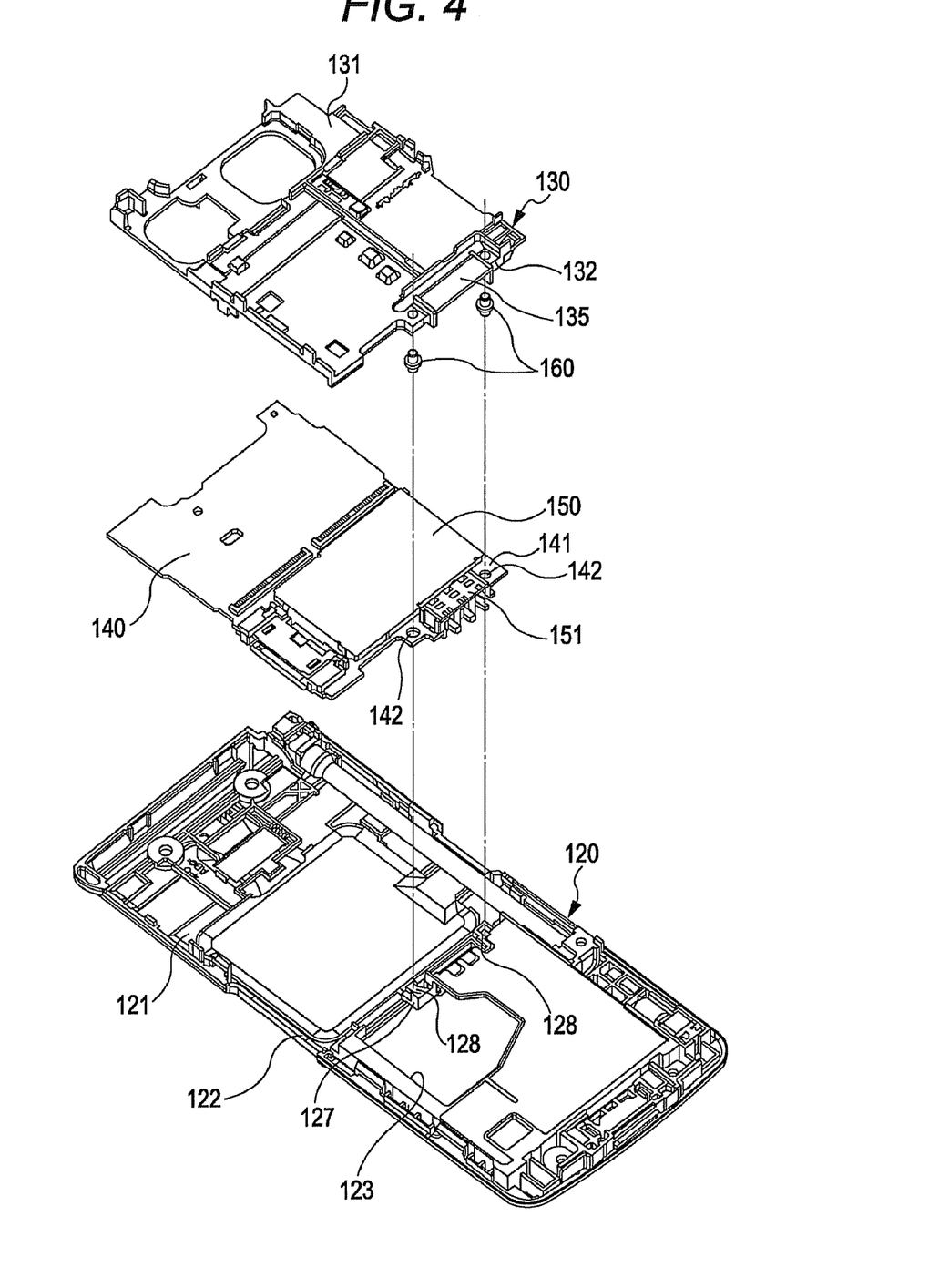
FIG. 4 is an exploded perspective view (upward direction) illustrating an inside of a fixed side rear case.
Figure 5:
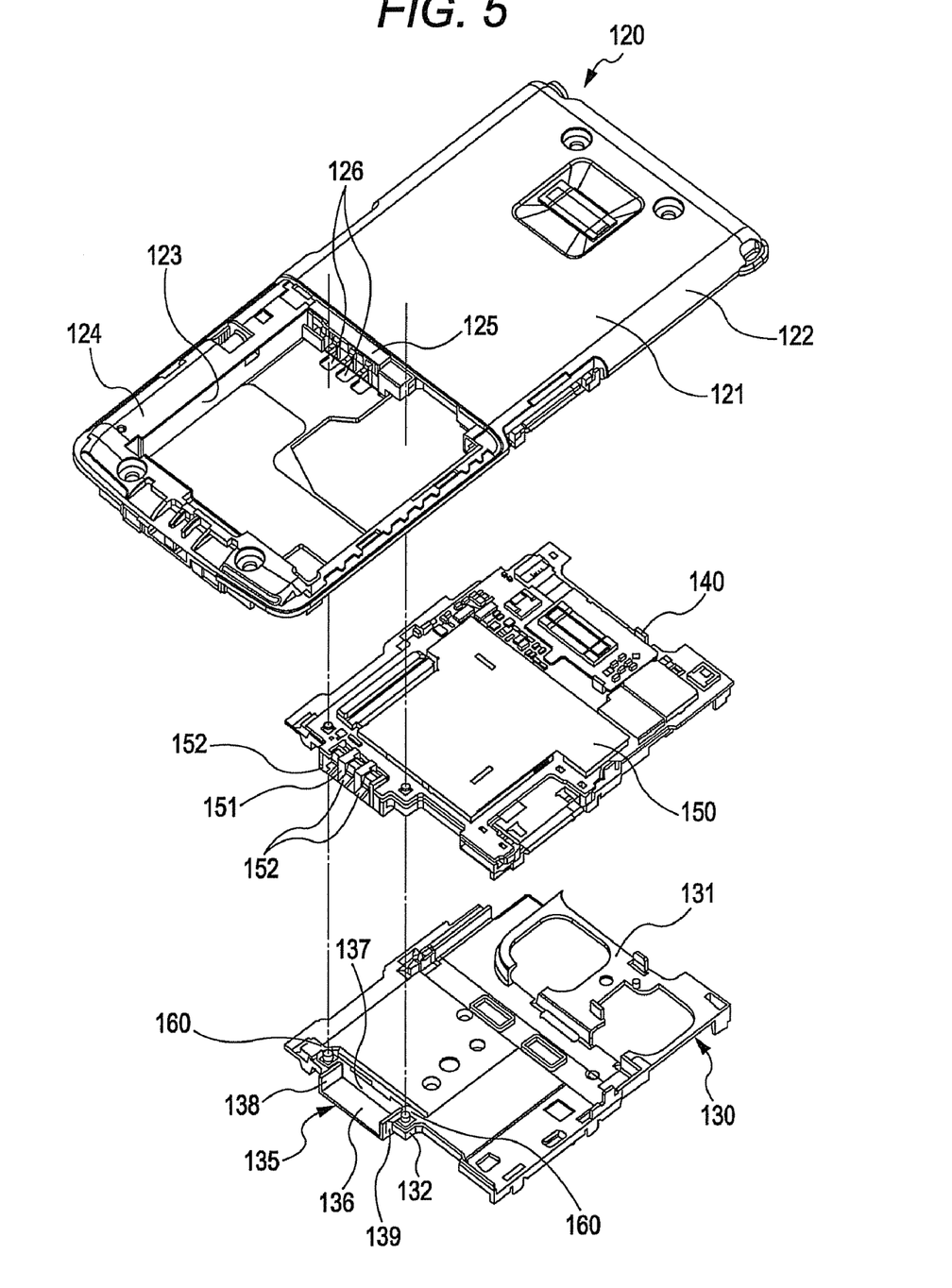
FIG. 5 is an exploded perspective view (downward direction) illustrating the inside of the fixed side rear case.

The connector supporting member 135 is provided in one of the end portions of the frame plate 130, for example, on the right of FIG. 4 or on the left of FIG. 5. The connector supporting member 135 supports the power connector 151 while a circumference of the power connector 151 is covered with the connector supporting member 135.

Figure 6A:
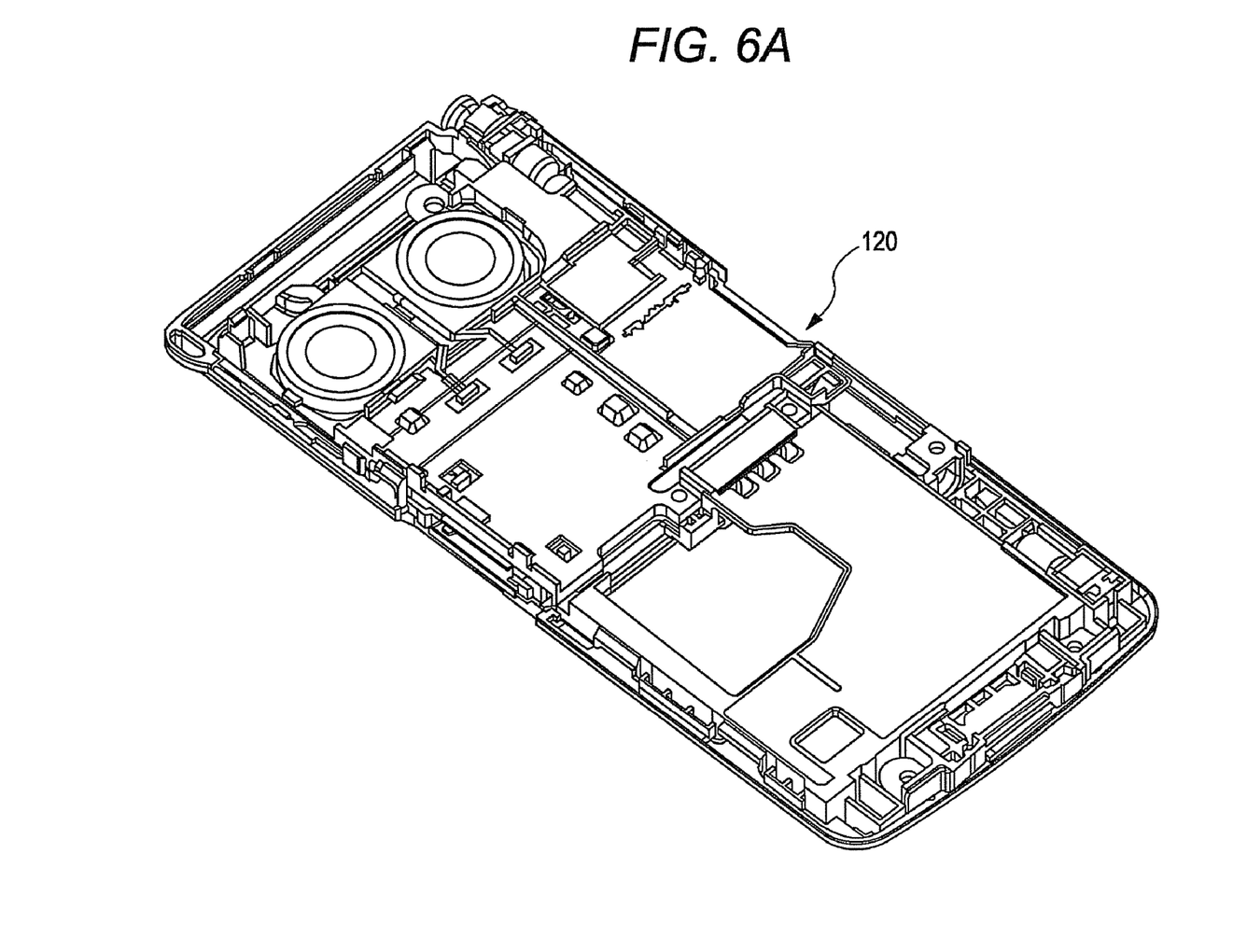
FIG. 6A is a perspective view (downward direction) illustrating an appearance of the fixed side rear case.
Figure 6B:
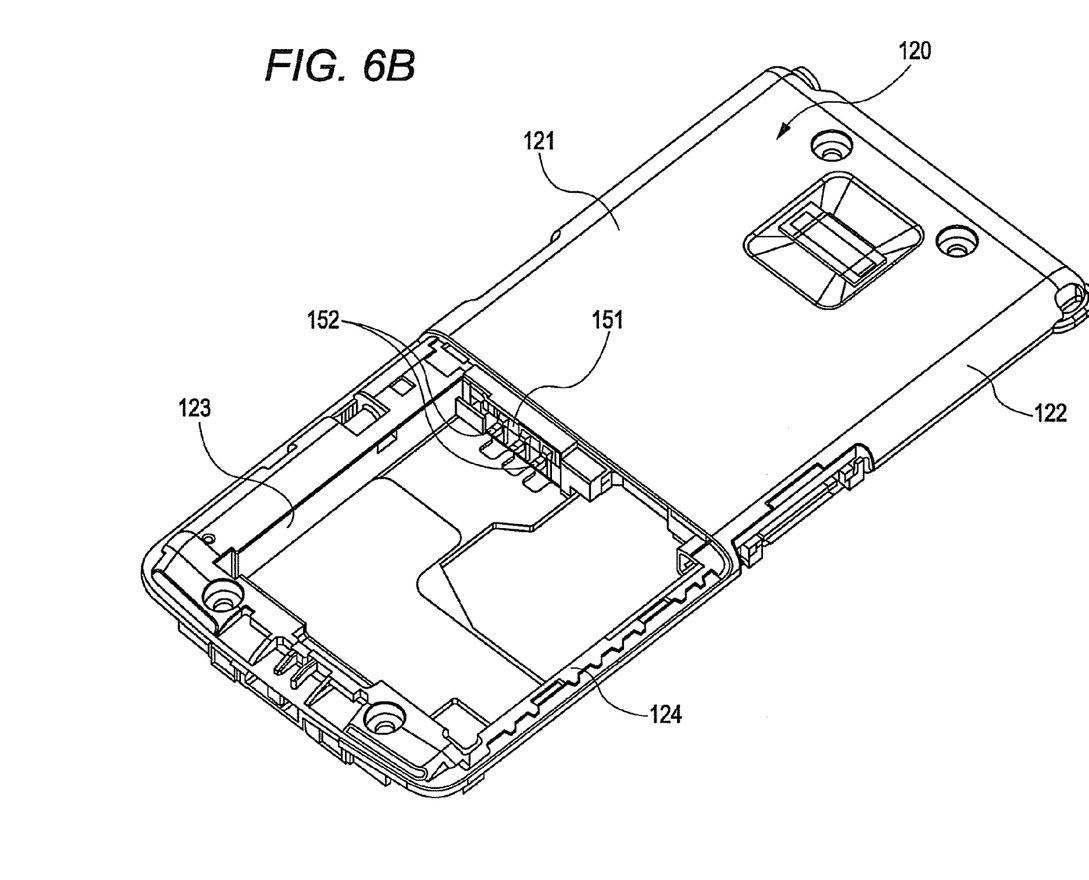
FIG. 6B is a perspective view (upward direction) illustrating the appearance of the fixed side rear case.

The detailed internal configurations of the fixed side housings and fixed side rear case will be described with reference to FIGS. 4, 5, 6A, and 6B. FIG. 4 is an exploded perspective view (upward direction) illustrating an inside of a fixed side rear case. FIG. 5 is an exploded perspective view (downward direction) illustrating the inside of the fixed side rear case. FIG. 6A is a perspective view (downward direction) illustrating an appearance of the fixed side rear case. FIG. 6B is a perspective view (upward direction) illustrating the appearance of the fixed side rear case The frame plate 130 entirely molded by a resin material is provided in the fixed side rear case 120 included in the fixed side housing 100 while laminated on a circuit board base plate 140 on which the circuit board 150 is mounted.

The fixed side rear case 120 of the fixed side housing 100 illustrated in FIGS. 6A and 6B includes a flat plate portion 121 and a side plate portion 122. The flat plate portion 121 is formed into a substantially low-profile box shape as a whole, and occupies the substantially whole region. The side plate portion 122 is located in the circumference of the flat plate portion 121. A connector plate portion 125, in which plural through-holes 126 are made, is provided in a side face portion of the battery storage portion 123. For example, the three through-holes 126 are made in FIG. 5. Three connecting terminals 152 of the power connector 151 are connected to the electrode terminal of the battery pack 20 while projected from the three through-holes 126.

The circuit board base plate 140 is formed by a sheet metal chassis having a square shape, and the circuit board 150 is provided in the circuit board base plate 140. The power connector 151, in which the plural connecting terminals 152 are provided, is fixed to one end portion of the circuit board base plate 140. For example, the three connecting terminals 152 are provided.

The frame plate 130 includes a frame main body portion 131. The frame main body portion 131 has a square shape and is molded by a resin material. An extended plate portion 132 extended outward is projected from one of end portions of the frame main body portion 131, for example, on the right of FIG. 4 or on the left of FIG. 5. The connector supporting member 135 is provided in the extended plate portion 132.

The connector supporting member 135 is formed by a resin member having a substantial U-shape. The resin member includes a lower-surface support plate 136, a backside support plate 137, and a pair of side face support plates 138 and 139. The lower-surface support plate 136 supports a lower surface of the power connector 151 fixed to one end portion of the circuit board 150. The backside support plate 137 supports a backside portion of the power connector 151. The pair of side face support plates 138 and 139 supports side face portions.

A pair of metal fixing pins 160 made of stainless steel is press-fitted in and fixed to the extended plate portion 132. The pair of fixing pins 160 is pieced through a pair of through-holes 142 of a fixed plate portion 141 provided in one end portion of the circuit board 150.

The pair of fixing pins 160 is fitted in and fixed to a pair of fitting holes 128 of a post portion 127 provided in one end portion of the fixed side rear case 120. In the mobile telephone 10 of the first embodiment, the circuit board 150 and the fixed side rear case 120 are fixed and supported by the pair of fixing pins 160, so that the displacement of the circuit board 150 may be prevented.

The fixed side rear case 120 included in the mobile telephone 10 includes the circuit board 150 and the frame plate 130 disposed adjacent to the circuit board 150. The power connector 151 is provided in one end portion of the circuit board 150. The power connector 151 is electrically connected to the electrode terminal of the battery pack 20 when the battery pack 20 is stored in the battery storage portion 123 formed in the fixed side rear case 120. The connector supporting member 135 is provided in one end portion of the frame plate 130. The connector supporting member 135 supports the power connector 151 while covering the circumference of the power connector 151. Accordingly, the terminal separation of the contact 153 of the power connector 151 and the instantaneous cut-out of the power, which are caused by the impact, may be prevented.

Other Embodiments

In the first embodiment, the invention is applied to the folding type of mobile telephone in which the hinge part is used. However, the invention may also be applied to mobile terminal devices having various hinge structures. For example, the invention may be applied to a mobile terminal device having a sliding type connecting structure or a turning type connecting structure.

In the first embodiment, the invention is applied to a mobile telephone as the mobile terminal device. The invention is not limited to the mobile telephone, but may be applied to various mobile terminal devices including an information processing terminal device such as PDA (Personal Digital Assistants), a music reproducing device, a mobile television, and a mobile game player.

All examples and conditional language recited herein for pedagogical purposes to aid the reader in understanding the principles of the invention and the concepts contributed by the inventor to furthering the art, and are to be construed as being without limitation to such specifically recited examples and conditions, nor does the organization of such example in the specification relate to a showing of the superiority and inferiority of the invention. Although the embodiments of the present inventions have been described in detail, it should be understood that the various changes, substitutions, and alterations could be made hereto without departing from the sprit and scope and scope of the invention.

What is claimed is:

1. A mobile terminal device, comprising:
a fixed side housing including a fixed side front case and a fixed side rear case, the fixed side rear case having a circuit board and a frame chassis disposed adjacent to the circuit board;
a movable side housing including a display, the movable side housing being connected to the fixed side housing with a connecting part;
a power connector that is provided in an end portion of the circuit board and has a connecting terminal, the connecting terminal being electrically connected to an electrode terminal of a battery pack when the battery pack is stored in a battery storage portion formed in the fixed side rear case; and
a connector supporting member that is provided in an end portion of the frame chassis, the connector supporting member supporting the power connector by covering a circumference of the power connector.

2. The mobile terminal device according to claim 1, wherein the connector supporting member comprises:
a lower surface support plate that supports a lower surface of the power connector; and
a backside support plate that supports a backside portion of the power connector.

3. The mobile terminal device according to claim 1, wherein a pair of fixing pin members is projected in an end portion of the frame chassis,
the fixing pin members are pierced through a pair of through-holes, the through-holes being formed in a fixed plate portion provided in an end portion of the circuit board, and
the fixing pin members are fitted in and fixed to a pair of fitting holes, the fitting holes being formed in an end portion of the fixed side rear case.

4. A mobile terminal device comprising:
a fixed side housing including a frame chassis disposed adjacent to a circuit board;
a movable side housing connected to the fixed side housing via a connecting part;
a power connector that includes a connecting terminal, the connecting terminal being electrically connected to an electrode terminal of a battery pack when the battery pack is stored in a battery storage portion formed in the fixed side housing; and
a connector supporting member that supports the power connector by covering a circumference of the power connector,
wherein the power connector is provided in an end portion of the circuit board, and the connector supporting member is provided in an end portion of the frame chassis.

* * * * *